Patented June 14, 1932

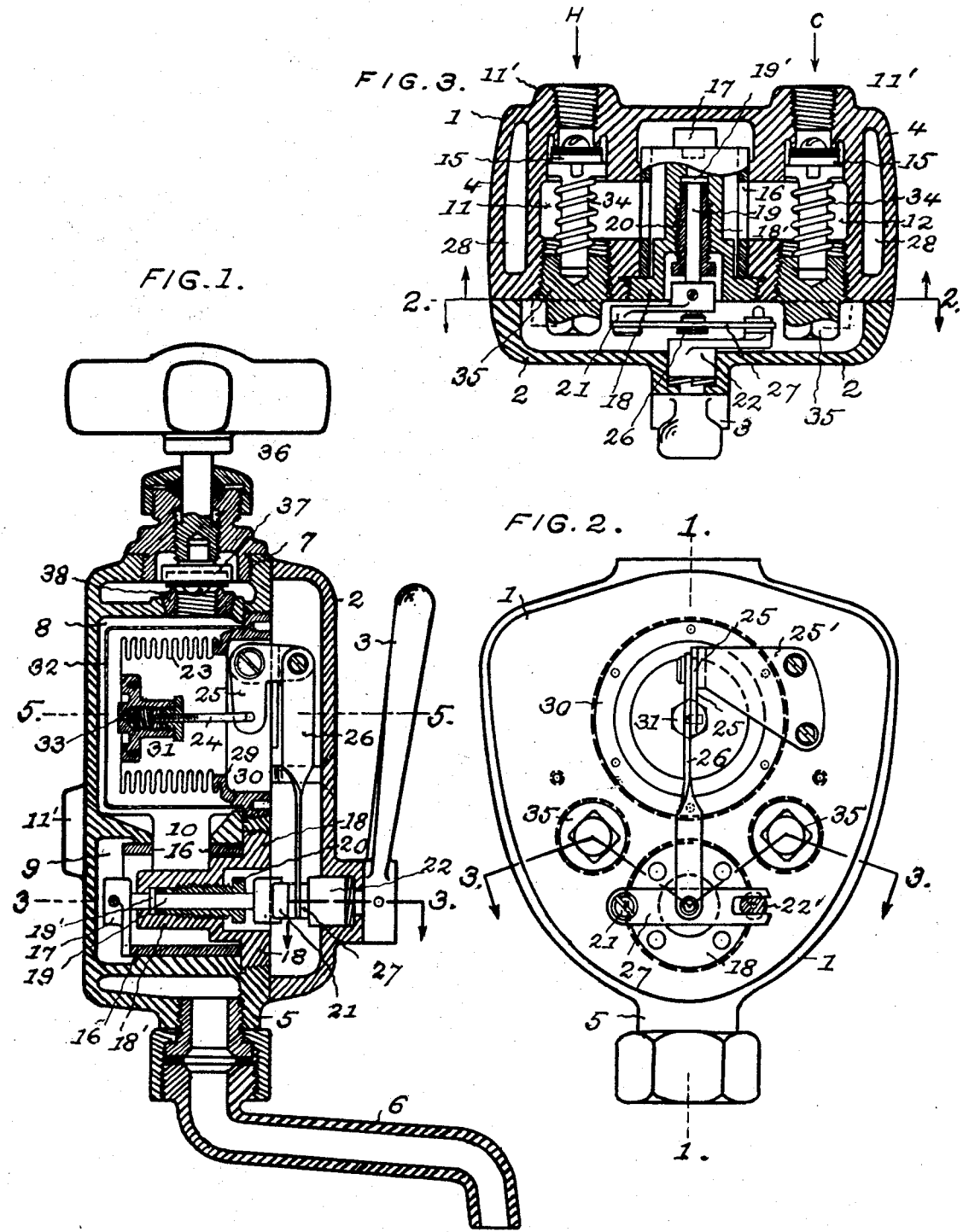

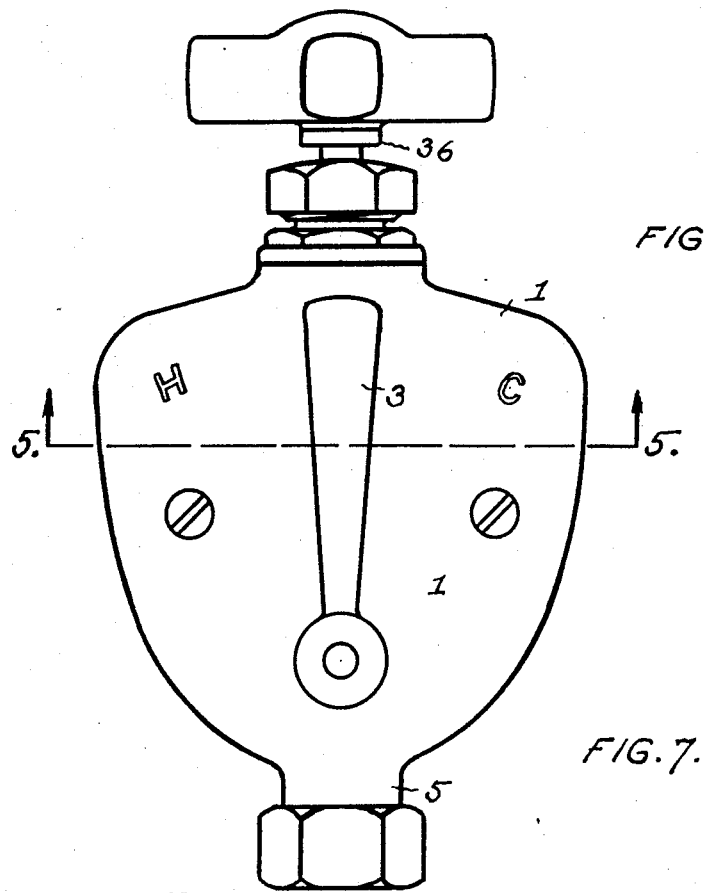
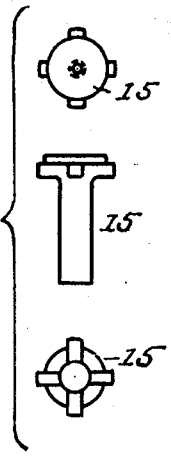
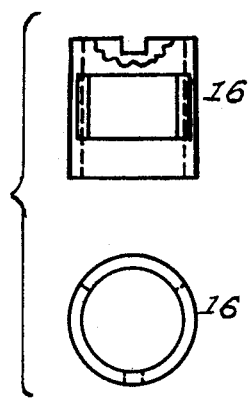
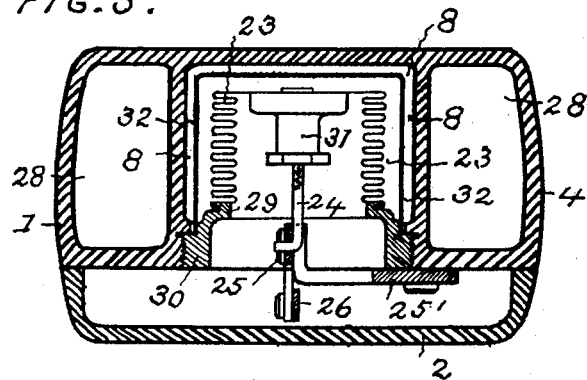

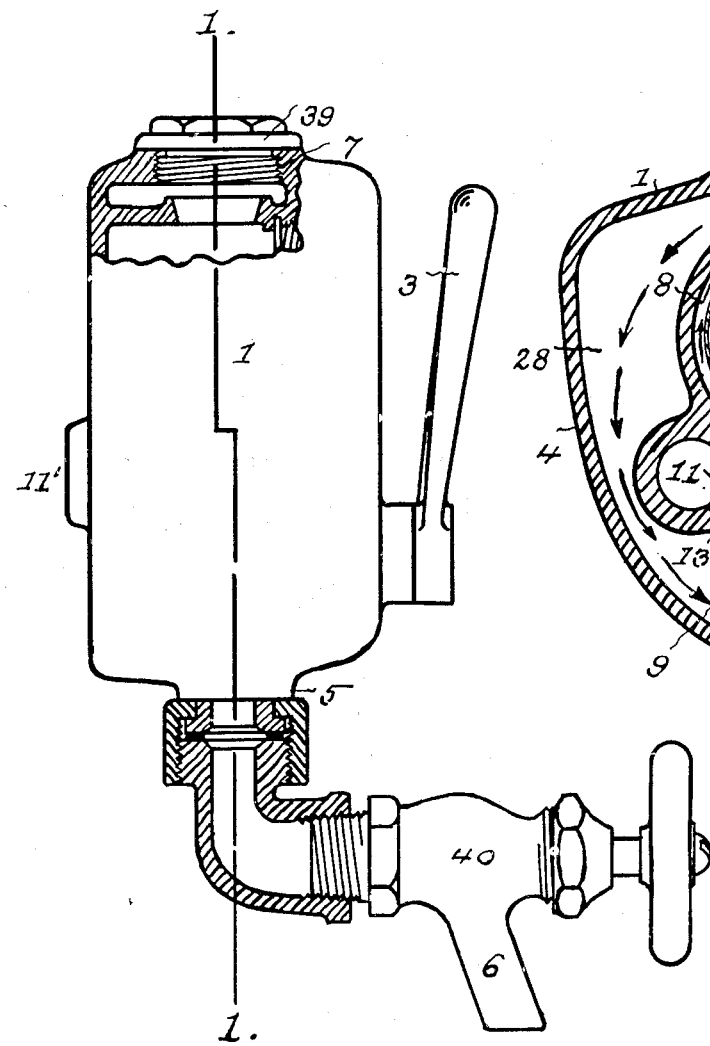
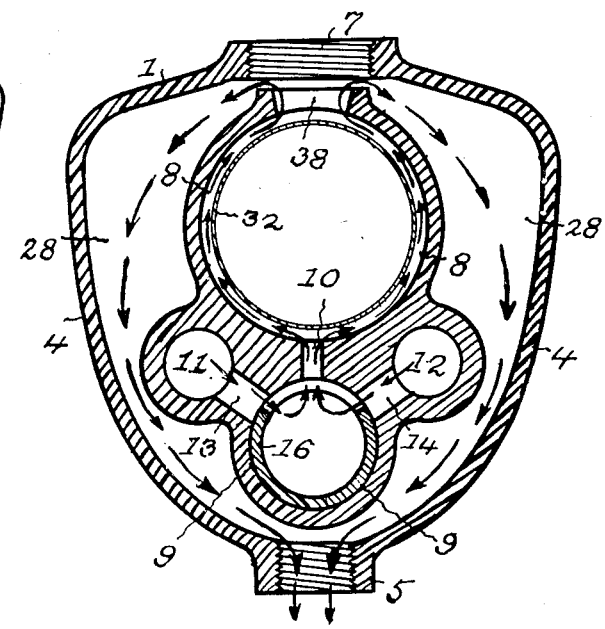

1,862,564

UNITED STATES PATENT OFFICE

HARRY A. BERN, OF CHICAGO, ILLINOIS

THERMOSTATIC MIXING VALVE

Application filed October 7, 1929, Serial No. 397,762. Renewed November 6, 1931.

This invention relates to that type of fluid mixing valves in which a flow of water of a predetermined temperature is attained through a thermostatic controlling means in an automatic manner from separate supplies of hot and cold water entering the valve body. The various objects of this improvement are:—

To provide a structural formation and combination of parts in the mechanism between the thermostatic member and the movable member of the valve controlling the inlet passages of the hot and cold water supplies by means of which the temperature of the water outflow from the valve body is automatically regulated and the desired temperature of such outflow attained in an accurate and effective manner.

To provide a structural arrangement of parts, in which the thermostatic member is arranged directly in the path of the outlet flow from the valve body, and wholly free from the disturbing influences of varying water pressure usual in the present type of valve structures, to attain a sensitive and accurate operation of the said thermostatic member and associated parts and mechanisms.

To provide in connection with the intermediate operating mechanism, above mentioned, a simple and effective means whereby a ready adjustment is made to produce an outflow of water of the desired temperature, without interference with or impedence of the normal operation of the thermostatic controlling unit of the structure.

To provide a structural formation and combination of parts in the valve structure, whereby the thermostatic controlling unit is enclosed and protected from pressure of the fluid flowing through the valve, and by means of which the unit is supported in proper operative relation to the parts and mechanisms with which it is associated.

To provide a structural formation of the controlling valve of the structure, in which a semi-rotary annular valve member is formed with ports or passages adapted to register with corresponding ports or passages in the stationary portion of such controlling valve structure, and in which the ports of the annular member is positioned so as to overlap the corresponding ports of the stationary member in an initial manual adjustment of the mechanisms for a desired degree of temperature in the outflow, and with a view to greater rapidity of action of the thermostatic controlling unit immediately following such manual adjustment, all as will hereinafter more fully appear.

In the accompanying drawings:—

Fig. 1 is a vertical section, on line 1—1, Fig. 2, of a fluid mixing valve, showing the preferred construction and arrangement of parts in this invention.

Fig. 2 is a front elevation of the same, with the front closure plate or head removed and with parts in section on line 2—2, Fig. 3.

Fig. 3 is a horizontal section on line 3—3, Fig. 2.

Fig. 4 is a front elevation of the valve, illustrative of the manual adjusting means.

Fig. 5 is a horizontal section on line 5—5, Figs. 1 and 4.

Fig. 6 is a combination of side and end elevations of the movable member of the inlet check valves of the structure.

Fig. 7 is a combination of top and end views of the semi-rotary annular member of the controlling valve of the structure.

Fig. 8 is a vertical section of the main housing of the valve on line 8—8, Fig. 9.

Fig. 9 is a side elevation showing a modified arrangement of the controlling valve of the water outlet passage of the structure.

Like reference numerals indicate like parts in the several views.

This application is a continuation in part of former application Serial No. 194,284, filed May 26, 1927.

In the preferred construction shown in the drawings, the housing for the mechanisms of the valve comprises a main body 1 provided at front with a removable closure head or cover 2, of a chambered formation and adapted to enclose the mechanisms which are not exposed to the fluid passing through the inner chambers of the structure, said closure head in addition provides a journal bearing for the hand lever 3 by which the manual adjustment of the mechanisms is effected. The main body 1 comprises an outer wall 4, the outline of which is preferably of a heart shape as shown, and which is formed at its lower end with an outlet neck 5 provided with means of attachment of an ordinary downturned discharge spout or nozzle 6, while at its upper end said outer wall is formed with a centrally arranged screw threaded orifice 7 adapted to receive either the hereinafter described outflow regulating valve or a blind closure plug, according to the different locations of the present valve structure. In addition said main body 1 comprises an internal chambered structure involving an upper central chamber 8 of a circular form in cross section with its upper end formed with a receiving orifice for the valve seat of the outflow regulating valve above referred to, also with a lower and somewhat smaller circular chamber 9, having communication with the upper chamber 8 by a central passage 10, and also with a pair of laterally spaced chambers 11 and 12 having communication with the aforesaid lower chamber 9 by individual ports or passages 13 and 14 which are controlled by a semi-rotary annular valve hereinafter described and which is arranged in said lower chamber in operative relation to the ports or passages 13, 14 aforesaid.

At one end each of said laterally spaced chambers 11 and 12 have individual communication with the respective hot and cold water inlet necks 11' and 12' of the rear wall of the main housing of the structure, with any tendency to a retrograde flow of the fluid in said parts prevented by check valves 15 hereinafter described in detail.

The annular controlling valve member 16 above referred to, fits and has close turning movement in the lower chamber 9 of the main housing, with its cylindrical wall formed with a single port or opening adapted to register with the aforesaid hot and cold water ports or passages 13 and 14, and with the passage 10 to the companion upper chamber 8, the arrangement being such that in a turning movement of the valve 16 the size of the opening of one port say 13, into the interior of the valve will be increased with a corresponding decrease in the opening of the companion port or passage 14 and vice versa, with a corresponding decrease and increase in the flows of hot and cold water to the interior of the valve member and its containing chamber 9.

In the preferred construction shown, the controlling valve member 16 is of a cylindrical shell form, open at its respective ends, and has at one end a notch or recess in its wall for engagement with the free end of an operating arm 17 of the operating mechanism now to be described.

The aforesaid operating arm 17 forms a member of such operating mechanism, which in addition comprises a stationary bushing 18 having screw thread or like connection in an orifice in the front wall of the valve housing, and is formed with a sleeve portion or extension 18' that projects centrally into the interior of the valve member 16 to form a journal support for a semi-rotary shaft 19 which is held in proper operative relation by an adjustable gland member 20 and a positioning collar 19' on the shaft.

At the rear end of the shaft 19 the aforesaid operating arm 17 is fixedly secured, while at its forward end said shaft carries a fixedly attached crank arm 21 adapted for operative connection with both the manual adjusting means of the construction and with the automatic thermostatically controlling means of the same.

The manual adjusting means just referred to comprises a hand lever 3 arranged exteriorly of the main housing of the valve, with its carrying shaft journalled in the closure head or cover 2 of the main housing, and carrying on its inner end a crank arm 22, the crank pin 22' of which has a non-circular formation for the purpose hereinafter set forth.

The thermostatic controlling means above referred to, is of a detail construction hereinafter described, including a bellows type of expansible shell 23, the movable end of which has rod connection 24 with one arm of a bell crank lever 25, the other arm of which has operative connection with a vertically depending link 26 having a central arrangement in the front closure head 2 of the main housing, and adapted for operative connection with the horizontally arranged and transversely extending bar 27 of a mechanism now to be described.

The bar 27 above referred to, is pivotally connected at one end to the crank pin of the crank arm 21 of the shaft 19 which has operative connection with the controlling valve 16 through the arm 17 aforesaid. At its opposite end the bar 27 is slidingly connected with the non-circular crank pin 22' of the crank arm 22 of the manual adjusting means, while at its mid-length the bar 27 is pivotally connected to the lower end of the depending link 26 of the aforesaid thermostatic controlling means.

The function of the bar 27 in its above described connection is of a two fold or alternating nature, to wit:

In an initial manual of the mechanism to obtain a desired degree of temperature in the outflow water from the valve, the central pivot connection of the bar 27 with the depending link 26 aforesaid, acts as a fixed pivot on which said bar 27 is adapted to have a rocking movement, so that as the crank arm 22 is moved in the manual adjusting operation, it will through the bar 27 as an intermediary, impart a corresponding turning movement to the crank arm 21 by which the controlling valve member is turned to a corresponding adjustment. While in an automatic adjustment of the parts, through the instrumentality of the thermostatic controlling means aforesaid, the non-circular crank pin 22' of the crank arm 22 of the manually adjusting means, acts as the fixed pivot axis for the bar 27, and the rocking movement of the bar 27 is now by the vertical movement of the depending link 26 under the influence of the thermostatic controlling connection thereof, with such movement of the bar 27 transmitted in turn through the crank arm 21, shaft 19 and operating arm 17 to the controlling valve member.

In the construction herein shown, the upper and lower chambers 8 and 9, in the interior of the main housing, are in central vertical alignment therein. Such arrangement provides side compartments 28 within said housing of an excess receiving capacity for the water coming from the upper chamber 8, so that the combined hot and cold water passing into said side compartments 28 is afforded time and space to attain an even and effective heat interchange before passage through said compartments.

In its detail construction the aforesaid thermostatic controlling means is of the longitudinally expansible shell type, preferably in the form of a cylindrical shell formed with a series of corrugations in the material of the shell, and having one end open and formed to fit and be secured to a circular ledge 29 of an annular attaching head 30, that is attached in an opening formed therefor in the front wall of the main housing, with the whole of the shell 23 having a central location in the upper chamber 8 of the main housing, as shown.

The closed and free end of the shell 23 carries a central fixed hub 31, in which the rod 24, heretofore mentioned, is adjustably attached at one end, while at the other end said rod is operatively connected to the vertical arm of the bell crank lever 25 pivotally mounted on a bracket arm 25' fixed on the front wall of the main housing, with the horizontal arm of said bell crank lever having operative connection with the depending link 26, heretofore described.

Associated with the corrugated shell 23 of the thermostatic controlling means and forming a part thereof is a closed enclosing shell 32 acting to house and protect said corrugated shell from the disturbing influences of the varying pressure in the water passages of the structure. The enclosing shell 32 is preferably of the cup shaped form shown, and is securely attached to the aforesaid attaching head 30 of the shell 23 so that the parts are detachable as a whole. The space between the shells 23 and 32 forms a receiving chamber for a filling of expansible liquid, such as sulphuric ether, to act as the expansion medium of the thermostatic controlling means.

In the construction above described, there is close concentric relation between the aforesaid shells 23 and 32 and the inner wall of the containing chamber 8 of the main housing, so that a rapid and effective heat interchange is attained between the passing water and the expansible means of the thermostatic control unit in actual use.

With a view to the convenient introduction of the expansible filling medium between the shells 23, 32 above referred to, the heretofore described hub 31 on the corrugated shell 23 is made tubular and formed with a filling passage 33, normally closed by a drop of solder or like closure means.

The movable member or valve head of each of the check valves 15, in the hot and cold water inlet passages 13 and 14 heretofore referred to, are of the reciprocating type and move to their respective seats in a direction opposite to the inflows of water, and are yieldingly returned to such position by springs 34 encircling the stems of said valve heads, with the parts held in proper operative relation by guide and abutment bushings 35, screwed or otherwise secured in the front wall of the main housing as shown in Fig. 3.

The manual control of the outflow of water from the present valve structure, is preferably attained by an outflow regulating valve 36 of the reciprocating type, the stationary housing of which has screw threaded attachment in the aforesaid upper screw threaded orifice 7 in the outer wall of the main housing, with the movable valve head 37 of the stop cock having closure engagement with a valve seat 38, screwed into the top portion of the wall of the inner and upper chamber 8 of the main housing, as shown in Fig. 1.

In cases where the present valve structure is built into the wall of a room, the above described orifice 7 in the outer wall of the main housing, is closed by a blind plug 39, and the outlet nozzle or spout 6 of the main housing provided with a stop cock 40, of a usual form, as illustrated in Fig. 9.

In the operation of the present valve construction, the hot and cold water supplies entering the controlling valve 16 in a controllable manner due to the automatic action of the same under the influence of the thermostatic control unit, passes through the central passage, into the upper chamber 8 and through the same in close contact with the thermostatic control unit located in said chamber. From the chamber 8, the flow takes place through the manually controlled passage 10 into the enlarged side compartments 28, in which, owing to their extended capacity, an effective mixture and uniform temperature of the water is attained, during its downward passage through said compartments to the outlet neck 5 of the main housing.

Having thus fully described my invention, what I claim and desire to secure by Letters Patent, is:—

1. The combination in a mixing valve, of a valve housing formed with an outlet chamber, a valve chamber and a pair of inlet chambers in lateral relation to said valve chamber and having openings into the same, the outer wall of the valve housing having a controlled outlet passage connected with the aforesaid outlet chamber and hot and cold water inlet openings connecting with said lateral chambers, a semi-rotary valve member arranged in said valve chamber in controlling relation to the inlet openings from said lateral chambers, a thermostatic controlling means arranged in said outlet chamber, the same comprising an inner expansion shell of the bellows type and an outer enclosing shell, operative connections between said inner shell and the said valve member and means for effecting manual adjustment of said valve member.

2. The combination in a mixing valve, of a valve main housing formed with a valve chamber, with a thermostatic control chamber communicating with said valve chamber, with a cold water supply chamber at one side of said valve chamber and opening into the same, and with a hot water supply chamber at the other side of said valve chamber and opening with the same, a chamber formed by the enclosing shell of the main housing having connection with said thermostatic control chamber at a point remote from said valve chamber, said shell having a controllable outlet passage and hot and cold water inlet passages entering the hot and cold water chambers aforesaid, a semi-rotary valve member arranged in the aforesaid valve chamber in controlling relation to the openings from the hot and cold water chambers, a thermostatic controlling unit arranged in the aforesaid thermostatic control chamber, operative connections between said unit and the semi-rotary valve member, and means for effecting manual adjustment of said semi-rotary valve member.

3. The combination in a mixing valve, of a valve main housing formed with a valve chamber, with a thermostatic control chamber communicating with said valve chamber, with a cold water supply chamber at one side of said valve chamber and opening into the same, and with a hot water supply chamber at the other side of said valve chamber and opening into the same, a chamber formed by the enclosing shell of the main housing having connection with said thermostatic control chamber at a point remote from said valve chamber, said shell having a controllable outlet passage and hot and cold water inlet passages entering the hot and cold water chambers aforesaid, a semi-rotary valve member having an annular shell form arranged in the valve chamber aforesaid in controlling relation to the openings from the hot and cold water chambers, a thermostatic controlling unit arranged in the aforesaid thermostatic control chamber, operative connections between said unit and the semi-rotary valve member, and means for effecting manual adjustment of said semi-rotary valve member.

4. The combination in a mixing valve, of a valve housing formed with a centrally arranged thermostatic control chamber provided with an outlet opening at top, with a centrally arranged valve chamber communicating with said thermostatic control chamber and with a pair of chambers in lateral relation to said valve chamber and having openings communicating therewith, an outflow regulating valve mounted in the valve housing with its movable valve head having closure engagement with the opening in the top of the thermostatic control chamber, the outer shell of the valve housing being formed with an outlet passage and with hot and cold water inlet passages entering the aforesaid lateral chambers, a semi-rotary valve member arranged in the aforesaid valve chamber in controlling relation to the openings from the lateral chambers, a thermostatic controlling unit arranged in the aforesaid thermostatic control chamber, operative connections between said unit and the semi-rotary valve member and means for effecting manual adjustment of said semi-rotary valve member.

5. The combination in a mixing valve, of a valve housing formed with a centrally arranged thermostatic control chamber provided with an outlet opening at top, with a centrally arranged valve chamber communicating with said thermostatic control chamber and with a pair of chambers in lateral relation to said valve chamber and having openings communicating therewith, an outflow regulating valve mounted in the valve housing with its movable valve head having closure engagement with the opening in the top of the thermostatic control chamber, the outer shell of the valve housing being formed with an outlet passage and with hot and cold water inlet passages entering the lateral passages aforesaid, a semi-rotary valve member arranged in the aforesaid lower chamber in controlling relation to the openings from the lateral chambers, a thermostatic controlling unit arranged in the aforesaid thermostatic control chamber, operative connections between said unit and the semi-rotary valve member, the same comprising a bell crank lever, one arm of which has rod connection with the movable end of the thermostatic controlling means and the other arm with a depending link, a depending link, a rock shaft journalled in operative relation to the semi-rotary valve member and having at one end an arm operatively connected to said valve member and at the other end a crank arm having intermediate operative connection with the aforesaid depending link, and manual means for adjusting the semi-rotary valve member.

6. The combination in a mixing valve, of a valve housing formed with a thermostatic control chamber, with a valve chamber communicating therewith, and with a pair of chambers in lateral relation to the valve chamber and having openings communicating therewith, the outer shell of the valve housing being formed with a controllable outlet passage and with hot and cold water inlet passages entering the lateral chambers aforesaid, a semi-rotary valve member arranged in the aforesaid lower chamber in controlling relation to the openings from the lateral chambers, a thermostatic controlling unit arranged in the aforesaid thermostatic control chamber, operative connection between said unit and the semi-rotary valve member, the same comprising a bell crank lever one arm of which has rod connection with the movable end of the thermostatic controlling means and the other arm with a depending link, a depending link, a rock shaft journalled in operative relation to the semi-rotary valve member and having at one end an arm operatively connected to said valve member and at the other end a crank arm having intermediate operative connection with the aforesaid depending link, and manual means for adjusting the semi-rotary valve member, the same comprising an externally arranged hand lever having a shaft journalled in the valve housing and a crank arm on the inner end of said shaft having intermediate operative connection with the aforesaid shaft of the semi-rotary valve member.

7. The combination in a mixing valve, of a valve housing formed with a thermostatic control chamber, with a valve chamber communicating therewith and with a pair of chambers in lateral relation to the valve chamber and having openings communicating therewith, the outer shell of the valve housing being formed with a controllable outlet passage and with hot and cold water inlet passages entering the lateral chambers aforesaid, a semi-rotary valve member arranged in the aforesaid valve chamber in controlling relation to the openings from the lateral chambers, a thermostatic controlling unit arranged in the aforesaid thermostatic control chamber, operative connection between said unit and the semi-rotary valve member, the same comprising a bell crank lever one arm of which has rod connection with the movable end of the thermostatic controlling means and the other arm with a depending link, a depending link, a rock shaft journalled in operative relation to the semi-rotary valve member and having at one end an arm operatively connected to said valve member and at the other end a crank arm having intermediate operative connection with the aforesaid depending link, and manual means for adjusting the semi-rotary valve member, the same comprising an externally arranged hand lever having a shaft journalled in the valve housing and a crank arm on the inner end of said shaft having intermediate operative connection with the aforesaid shaft of the semi-rotary valve member, said intermediate connection comprising a transverse bar pivotally connected at one end to the crank arm of the operating shaft of the valve member, at its other end to the crank arm of the manual adjusting means, and at its mid-length to the aforesaid depending link.

8. The combination in a mixing valve, of a valve housing formed with a thermostatic control chamber, with a valve chamber communicating therewith, and with a pair of chambers in lateral relation to the valve chamber and having openings communicating therewith, the outer shell of the valve housing being formed with a controllable outlet passage and with hot and cold water inlet passages entering the lateral chambers aforesaid, a semi-rotary valve member arranged in the aforesaid lower chamber in controlling relation to the openings from the lateral chambers, a thermostatic controlling unit arranged in the aforesaid thermostatic control chamber, operative connection between said unit and the semi-rotary valve member, the same comprising a bell crank lever one arm of which has rod connection with the movable end of the thermostatic controlling means and the other arm with a depending link, a depending link, a rock shaft journalled in operative relation to the semi-rotary valve member and having at one end an arm operatively connected to said valve member and at the other end a crank arm having intermediate operative connection with the aforesaid depending link, and manual means for adjusting the semi-rotary valve member, the same comprising an externally arranged hand lever having a shaft journalled in the valve housing and a crank arm on the inner end of said shaft having intermediate operative connection with the aforesaid shaft of the semi-rotary valve member, said intermediate connection comprising a transverse bar pivotally connected at one end to the crank arm of the operating shaft of valve member, at its other end to the crank arm of the manual adjusting means and at its mid-length to the aforesaid depending link, the connection between the transverse bar and the crank arm of the manual adjusting means comprising a non-circular crank pin and elongated slot formation of the parts.

9. The combination in a mixing valve, of a valve housing formed with an outlet chamber, a valve chamber and a pair of inlet chambers in lateral relation to said valve chamber and having openings into the same, the outer wall of the valve housing having a controllable outlet passage connected with the aforesaid outlet chamber, and hot and cold water inlet openings connecting with said lateral chambers, a movable valve member arranged in said valve chamber in controlling relation to the inlet openings from said lateral chambers, a thermostatic controlling means arranged in said outlet chamber, a bell crank lever journalled in the valve housing with one arm connected to the movable end of the thermostatic controlling means and the other arm to a depending link, a depending link, a rock shaft journalled in operative relation to the movable valve member and having at one end an arm operatively connected to said valve member and at the other end a crank arm having intermediate operative connection with the aforesaid depending link, and manual means for adjusting the movable valve member.

10. The combination in a mixing valve, of a valve housing formed with an outlet chamber, a valve chamber and a pair of inlet chambers in lateral relation to said valve chamber and having openings into the same, the outer wall of the valve housing having a controllable outlet passage connected with the aforesaid outlet chamber, and hot and cold water inlet openings connecting with said lateral chambers, a movable valve member arranged in said valve chamber in controlling relation to the inlet openings from said lateral chambers, a thermostatic controlling means arranged in said outlet chamber, a bell crank lever journalled in the valve housing with one arm connected to the movable end of the thermostatic controlling means and the other arm to a depending link, a depending link, a rock shaft journalled in operative relation to the movable valve member and having at one end an arm operatively connected to said valve member and at the other end a crank arm having intermediate operative connection with the aforesaid depending link, and manual means for adjusting the movable valve member, the same comprising an externally arranged hand lever having a shaft journalled in the valve housing and a crank arm on the inner end of said shaft having intermediate operative connection with the rock shaft of the movable valve member.

11. The combination in a mixing valve, of a valve housing formed with an outlet chamber, a valve chamber and a pair of inlet chambers in lateral relation to said valve chamber and having openings into the same, the outer wall of the valve housing having a controllable outlet passage connected with the aforesaid outlet chamber, and hot and cold water inlet openings connecting with said lateral chambers, a movable valve member arranged in said valve chamber in controlling relation to the inlet openings from said lateral chambers, a thermostatic controlling means arranged in said outlet chamber, a bell crank lever journalled in the valve housing with one arm connected to the movable end of the thermostatic controlling means and the other arm to a depending link, a depending link, a rock shaft journalled in operative relation to the movable valve member and having at one end an arm operatively connected to said valve member and at the other end a crank arm having intermediate operative connection with the aforesaid depending link, and manual means for adjusting the movable valve member, the same comprising an externally arranged hand lever having a shaft journalled in the valve housing and a crank arm on the inner end of said shaft having intermediate operative connection with the rock shaft of the movable valve member, said intermediate connection comprising a transverse bar pivotally connected at one end to the crank arm of the operating shaft of the valve member, at its other end to the crank arm of the manual adjusting means, and at its mid-length to the aforesaid depending link.

12. The combination in a mixing valve, of a valve housing formed with an outlet chamber, a valve chamber and a pair of inlet chambers in lateral relation to said valve chamber and having openings into the same, the outer wall of the valve housing having a controllable outlet passage connected with the aforesaid outlet chamber, and hot and cold water inlet openings connecting with said lateral chambers, a movable valve member arranged in said valve chamber in controlling relation to the inlet openings from said lateral chambers, a thermostatic controlling means arranged in said outlet chamber, a bell crank lever journalled in the valve housing with one arm connected to the movable end of the thermostatic controlling means and the other arm to a depending link, a depending link, a rock shaft journalled in operative relation to the movable valve member and having at one end an arm operatively connected to said valve member and at the other end a crank arm having intermediate operative connection with the aforesaid depending link, and manual means for adjusting the movable valve member, the same comprising an externally arranged hand lever having a shaft journalled in the valve housing and a crank arm on the inner end of said shaft having intermediate operative connection with the rock shaft of the movable valve member, said intermediate connection comprising a transverse bar pivotally connected at one end to the crank arm of the operating shaft of the valve member, at its other end to the crank arm of the manual adjusting means, and at its mid-length to the aforesaid depending link, the connection between the transverse bar and the crank arm of the manual adjusting means comprising a non-circular crank pin and elongated slot formation of the parts.

In testimony whereof I hereunto affix my signature.

HARRY A. BERN.